(12) United States Patent
Grushkevich

(10) Patent No.: US 7,949,805 B2
(45) Date of Patent: May 24, 2011

(54) WIRELESS HUMAN INTERFACE DEVICE (HID) COORDINATION

(75) Inventor: Asif Grushkevich, La Jolla, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/686,193

(22) Filed: Jan. 12, 2010

(65) Prior Publication Data

US 2010/0115151 A1    May 6, 2010

Related U.S. Application Data

(63) Continuation of application No. 11/932,214, filed on Oct. 31, 2007, now Pat. No. 7,664,894.

(60) Provisional application No. 60/972,298, filed on Sep. 14, 2007.

(51) Int. Cl.
*G06F 13/10* (2006.01)

(52) U.S. Cl. ............................. 710/64; 710/72

(58) Field of Classification Search ........................ None
See application file for complete search history.

(56) References Cited

U.S. PATENT DOCUMENTS

| | | | |
|---|---|---|---|
| 6,304,250 B1 * | 10/2001 | Yang et al. .................. 345/168 |
| 6,747,634 B1 * | 6/2004 | Yang ........................... 345/168 |
| 6,993,049 B2 | 1/2006 | Davies et al. |
| 7,038,906 B2 * | 5/2006 | Hubbard ................. 361/679.09 |
| 7,164,886 B2 * | 1/2007 | Mowery et al. ............. 455/41.2 |
| 7,227,530 B1 * | 6/2007 | Yang ........................... 345/158 |
| 7,228,108 B2 * | 6/2007 | Ayatsuka et al. ............... 455/73 |
| 7,292,850 B2 * | 11/2007 | Itabashi ....................... 455/425 |
| 7,369,532 B2 | 5/2008 | Silvester |
| 7,436,300 B2 * | 10/2008 | Glass et al. ................. 340/568.1 |
| 7,522,545 B2 * | 4/2009 | Lou et al. ..................... 370/310 |
| 7,532,872 B2 * | 5/2009 | Lazzarotto et al. ......... 455/226.1 |
| 7,626,576 B2 * | 12/2009 | Anandakumar et al. ...... 345/173 |
| 7,629,958 B1 * | 12/2009 | Nicolet et al. ................ 345/156 |
| 7,711,388 B2 * | 5/2010 | Noda et al. ................. 455/550.1 |
| 7,730,152 B2 * | 6/2010 | Zhuang et al. ............... 709/208 |
| 2003/0092437 A1 * | 5/2003 | Nowlin et al. ................ 455/420 |
| 2004/0131078 A1 * | 7/2004 | Gupta et al. .................. 370/466 |
| 2005/0289225 A1 | 12/2005 | Zhuang et al. |
| 2007/0130371 A1 | 6/2007 | Chung et al. |
| 2007/0132733 A1 * | 6/2007 | Ram .............................. 345/163 |
| 2008/0125040 A1 * | 5/2008 | Kalayjian .................... 455/41.2 |
| 2009/0077283 A1 | 3/2009 | Grushkevich |
| 2009/0251413 A1 * | 10/2009 | Winchester ................... 345/163 |

* cited by examiner

*Primary Examiner* — Cheng-Yuan Tseng
(74) *Attorney, Agent, or Firm* — Brake Hughes Bellermann, LLP

(57) ABSTRACT

A method relating to wireless human interface device (HID) coordination is disclosed. A first human interface device (HID) is wirelessly coupled to two or more computing devices, wherein the first HID is configured to toggle between interactions with each of the two or more computing devices. An inquiry or paging message is broadcast to one or more HIDs, including a second HID wirelessly coupled to the two or more computing devices, wherein the second HID is configured to receive and provide a response to the inquiry or paging message. The second HID is located based on the response to the inquiry or paging message. A wireless link is established between the first HID and the second HID based on the identifying, wherein the first HID is configured to coordinate, via the wireless link, interactions with the two or more computing devices by both the first HID and the second HID based on the toggle.

20 Claims, 5 Drawing Sheets

WIRELESS HUMAN INTERFACE DEVICE (HID) COORDINATION

CROSS-REFERENCE TO RELATED APPLICATIONS

This is a continuation of U.S. patent application Ser. No. 11/932,214, filed on Oct. 31, 2007, entitled "WIRELESS HUMAN INTERFACE DEVICE (HID) COORDINATION, now U.S. Pat. No. 7,664,984, which claims priority under 35 U.S.C. §119(e) to U.S. Provisional Application Ser. No. 60/972,298, filed on Sep. 14, 2007, entitled "WIRELESS HUMAN INTERFACE DEVICE (HID) COORDINATION." Each of the aforementioned applications is hereby incorporated by reference in its entirety for all purposes.

TECHNICAL FIELD

This description relates to wireless human interface device (HID) coordination.

BACKGROUND

As wireless technologies become more popular and are more widely integrated with products that previously required physical cords or wires to connect to other products, there is a corresponding increase in the desired range of use of these wireless products. For example, it may be desirable for a wireless keyboard and mouse that work with a single computer to work with multiple computers.

Among the more popular wireless standards used to wirelessly couple or connect two devices within a relatively small physical radius of each other is Bluetooth. Bluetooth technology, for example, has enabled users to interact with their computers using a Bluetooth enabled wireless mouse and/or wireless keyboard.

However, as referenced above, it may be the case that the user who is able to use a wireless mouse and keyboard to interact with a single computer, may desire to use the same wireless keyboard and mouse to interact with multiple computers. Then for example, it may be helpful, if not necessary, to have a way to coordinate which of the computers the wireless devices are currently configured to interact with (e.g., which wireless channels are active), and which wireless channels are inactive. However to connect the wireless keyboard and mouse (e.g., wireless devices) with a cord may defeat the purpose of having wireless devices in the first place, thus a coordination system may only be useful if it allows the wireless devices to coordinate with each other without a cord and without draining the power supply of the devices by maintaining extra active wireless channels.

SUMMARY

A system and method associated with wireless human interface device (HID) coordination is disclosed, substantially as shown in and/or described in connection with one or more of the figures, and as set forth more completely in the claims.

DETAILED DESCRIPTION

Figure 1:
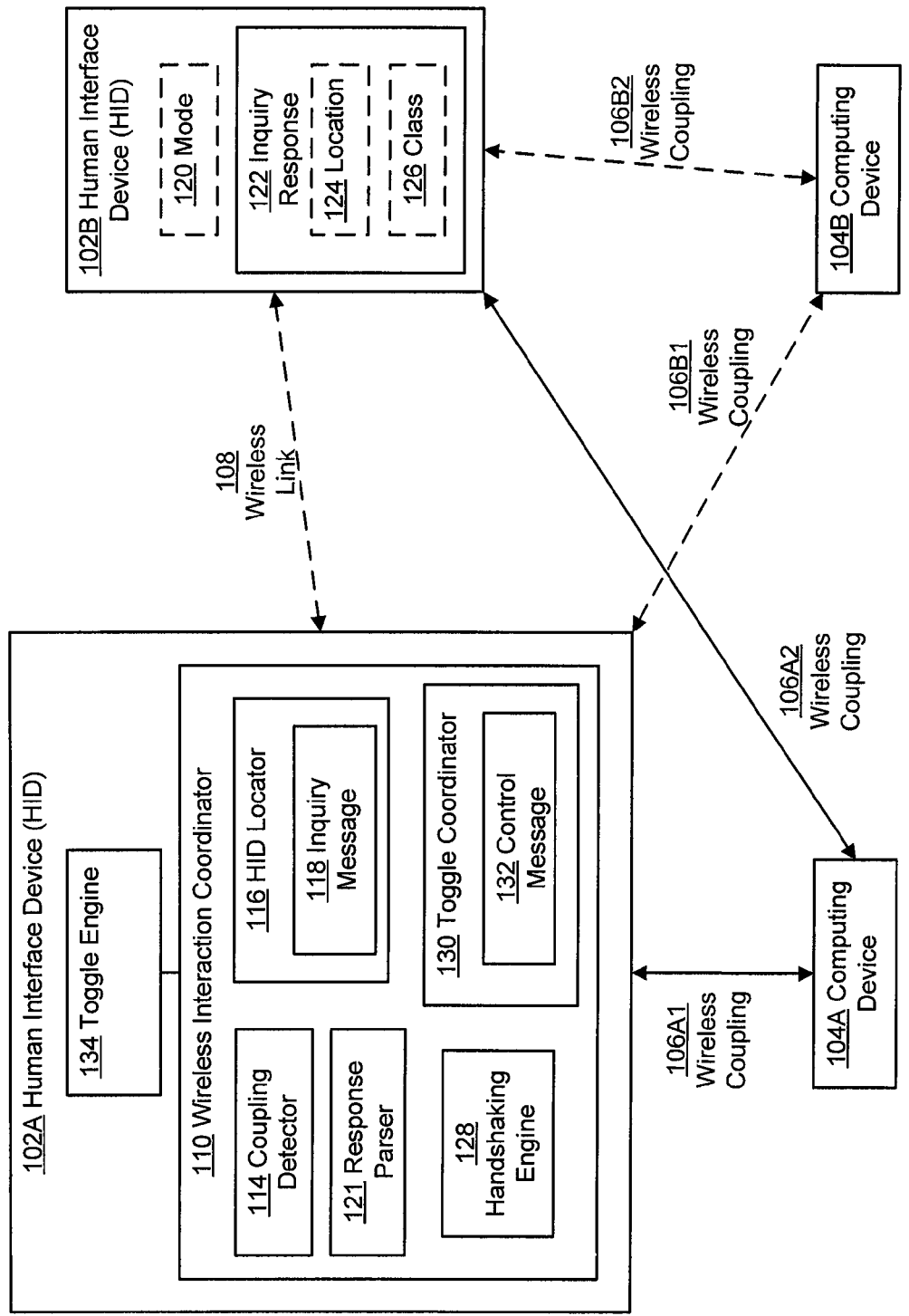
FIG. 1 is a block diagram of an example system for a human interface device (HID) coordination system, according to an example embodiment.

FIG. 1 is a block diagram of an example system for a human interface device (HID) coordination system 100, according to an example embodiment. In the example of FIG. 1, the system 100 may, upon determining that a human interface device (HID) 102A is wirelessly coupled to two or more computing devices 104A and 104B, establish a wireless communication path (e.g., wireless link 108) between the HID 102A and the HID 102B, which may also be wirelessly coupled to the two or more computing devices 104A and 104B. Although two HIDs 102A and 102B are shown in FIG. 1, more than two HIDs can be used in the system 100 illustrated in FIG. 1. Establishing the wireless link 108 between the HID 102A and the HID 102B may allow, for example, the interactions between the HIDs 102A and 102B with the computing devices 104A and 104B to be coordinated, such that both HIDs 102A and 102B interact with the same computing device 104A at the same time. Then for example, if one of the HIDs (e.g., 102A) is toggled to interact with a second, different computing device 104B, then the system 100 may send a signal to the other HID (e.g., 102B) to toggle to interact with the second computing device 104B. The system 100 may include an additional advantage of being able to deactivate or otherwise snooze communication paths between devices, including the HIDs 102A and 102B and/or the computing devices 104A and 104B, which may in turn save on the power consumption and/or battery life of the devices.

Human interface devices (HIDs) (e.g., HIDs 102A and 102B) may include any device configured to receive input directly from a human and to communicate that input wirelessly to the computing devices 104A and 104B. For example, the HIDs 102A and 102B may include a mouse, keyboard, pointer, trackball, touchpad, graphics tablet, joystick, gamepad, remote control, microphone, speaker, headset or other device that receives human input and communicates the input wirelessly to a computing device. Thus, the HIDs 102A and 102B may receive an input from a user and wirelessly transmit the input to the computing device 104A and 104B over a wireless communication channel. According to an example embodiment, the HIDs 102A and 102B may be Bluetooth compatible wireless devices configured to transmit the input via a Bluetooth communication channel. In other example embodiments, the HIDs 102A and 102B may include two-way devices configured to receive and process input from the computing devices 104A and 104B.

The computing devices 104A and 104B may include any computing devices configured to receive wireless input from the HIDs 102A and 102B. The computing devices 104A and 104B may include, for example, a laptop computer, a desktop computer, a notebook computer, a personal digital assistant (PDA), a cellular or mobile phone, a monitor, or other computing device. As discussed above, the computing devices 104A and 104B are wirelessly coupled to, and receive input from, the HIDs 102A and 102B. For example, the HID 102A may be a wireless keyboard wirelessly coupled to a computer 104A, and when a user strikes a key on the keyboard 102A the keystroke can be transmitted wirelessly to the computer 104A.

The wireless transmission between the HIDs 102A, 102B and the computing devices 104A, 104B, as just referenced, may occur via one or more wireless couplings 106 (e.g., 106A1, 106A2, 106B1, and 106B2). The wireless couplings 106 may include a wireless communication path, channel, link or other coupling between an HID 102A, 102B and a computing device 104A, 104B. According to an example embodiment, each HID-computing device pair may be connected via a separate coupling 106. The wireless couplings 106 may include a Bluetooth channel, or other wireless or industrial specification compatible wireless communication path, and may form at least a portion of a piconet or personal area network (PAN).

According to an example embodiment, in a piconet, a first device may be referred to as a master device and may be interconnected or wirelessly coupled with up to seven slave devices. The master device may initiate communication with the slave devices, but not vice versa. For example, a first piconet may be formed between the computing device 104A and the HIDs 102A and 102B via the wireless couplings 106A1 and 106A2, respectively, where the computing device 104A may be the master device, and the HIDs 102A and 102B may be slave devices. A second, similar piconet, may be formed between the computing device 104B and the HIDs 102A and 102B via the wireless couplings 106B1 and 106B2, respectively, where the computing device 104B may be the master device, and the HIDs 102A and 102B may be the slave devices. As will be discussed in more detail below, a third piconet may be formed between the HID 102A and HID 102B via the wireless link 108, where the HID 102A may be the master device and the HID 102B the slave device.

The wireless link 108 may enable wireless communication between two or more HIDs. For example, the wireless link 108 may include a wireless communication path, channel, link or other coupling configured to enable wireless communication between the HID 102A and HID 102B. The wireless link 108 may be adapted or configured to a wireless standard, such as Bluetooth, and may include for example, a Bluetooth channel.

According to an example embodiment, each wireless channel (e.g., 106A1, 106A2, 106B1, 106B2, and 108) in the example of FIG. 1, once established, may be in an active state (e.g., an "Active" Mode) or an inactive state (e.g., a "Power Save" Mode). The inactive state may reduce the overall power consumption of the system 100 and/or increase the battery life of one or more of the devices (e.g., 102A, 102B, 104A, and/or 104B). For example, a wireless channel not currently being used may be placed in an inactive state. During the inactive state, for example, a wireless channel may be periodically temporarily activated to ensure the connection between two devices remains valid. In the example of FIG. 1, the wireless couplings 106A1 and 106B1 may be in an active mode, and the wireless couplings 106A2 and 106B2 may be in a power save mode. Then for example, any user input transmitted from either of the HIDs 102A or 102B would be transmitted to the computing device 104A via one of the active wireless couplings 106A1 or 106A2, respectively. However, the active channels may changed and/or be toggled.

As referenced above, a wireless interaction coordinator 110 may coordinate the interactions between the HIDs 102A and 102B and the computing devices 104A and 104B, such that the HIDs 102A and 102B both interact with the same computing device 104A, 104B at the same time. For example, the wireless interaction coordinator 110 may send communications from the master device (e.g., HID 102A) to the slave device(s) (e.g., HID 104B) on the third piconet (via wireless link 108), as referenced above, indicating with which computing device 104A or 104B the slave device(s) should have an active channel (e.g., wireless coupling 106A2 or 106B2).

The wireless interaction coordinator 110 may include a coupling detector 114. The coupling detector 114 may determine which wireless channels, if any, have been established between one or more devices. For example, the coupling detector 114 may determine that the HID 102A is wirelessly coupled to the computing devices 104A and 104B. Then, for example, upon determining that the HID 102A is coupled to more than one computing device 104A, the wireless interaction coordinator 110 may establish and/or the coupling detector 114 may try to detect or otherwise determine that the wireless link 108 exists between the HIDs 102A and 102B.

According to an example embodiment, the wireless link 108 may be established and/or determined only after the coupling detector 114 has determined that the HID 102A is wirelessly coupled to two or more computing devices 104A and 104B. For example, only if both the HIDs 102A and 102B both are wirelessly coupled to two or more computing devices (e.g., 104A and 104B), may there be any need for coordination between the HIDs 102A and 102B. It may be assumed, for example, that if the HID 102A is coupled to the two computing devices 104A and 104B, that the HID 102B is also coupled to the two computing devices 104A and 104B. Then, for example, the wireless interaction coordinator 110 may coordinate the interactions of the HIDs 102A and 102B via the wireless link 108. However, if the HIDs 102A and 102B are only coupled to the computing device 104A, then the coordination may occur automatically in that there is only one computing device 104A connected to the HIDs 102A and 102B.

An HID locator 116 may be configured in one HID (e.g., an HID that acts as a master in a piconet) to locate one or more other HIDs (e.g., HIDs that act as slaves in the piconet). For example, a wireless keyboard HID can act as a master to a wireless mouse slave HID. As referenced above, if the coupling detector 114 is unable to detect or otherwise determine the wireless link 108 between the master and slave HIDs, the HID locator 116 may broadcast an inquiry or paging message 118 to whatever HIDs are within a broadcast range of the HID 102A. The messages may, for example, reach only those devices within a particular radius or geographic area relative to the HID 102A. In other example embodiments, as will be discussed in greater detail below, a device receiving the inquiry or paging message 118 may need to be configured in a discoverable setting or mode.

The inquiry or paging message 118 may include a signal, bitstream, or other message to be transmitted to one or more devices for determining or otherwise discovering one or more devices (e.g., HID 102B). For example, the inquiry message or paging 118 may request a response from whichever class of devices (COD), including HID 102B, that receive the inquiry message or paging 118. Then for example, the HID 102B, if operating in a discoverable or inquiry or page scanning mode (e.g., mode 120), may receive the inquiry message or paging 118 and respond with an inquiry or paging response 122.

As referenced above, the HID 102B, may be operating in any one of several modes 120. For example, the mode 120 may include an operational mode and a discoverable mode (e.g., for receiving an inquiry or paging message). In the discoverable mode the HID 102B may be configured to receive and respond to the inquiry or paging message 118, in order to form a new wireless connection (e.g., wireless link 108). For example, during the discoverable mode the HID 102B may be discoverable by one or more devices wherein it may receive the inquiry or paging message 118, and the HID 102B may be configurable to be wirelessly coupled to or otherwise associated with another device (e.g., HID 102A). In an operational mode, the HID 102B may be interacting with the computing device 104A and/or 104B, but may prevented from receiving or accepting the inquiry or paging message 118, or may be prevented from forming any new wireless channels, links or other couplings with HIDs 102A. In the operational mode, the wireless link 108 may or may not already be established. According to an example embodiment, the HID 102A may be configured to determine in which mode 120 the HID 102B is currently operating. Then for example, the HID 102A may be further configured to relay this information to a user, perhaps for example, through a visible signal from light emitting diode (LED) or other indicator located on the HID 102A.

The inquiry or paging response 122 may include a response, signal, bitstream or other message transmitted in response to the inquiry or paging message 118. For example, as discussed above, the inquiry or paging message 118 may be transmitted to a plurality of devices. Then for example, the HID 102B, which received the inquiry or paging message 118 may respond with the inquiry or paging response 122. The inquiry or paging response 122 may identify the HID 102B to the HID 102A and/or wireless interaction coordinator 110 receiving the inquiry or paging response 122. Based on the one or more inquiry or paging responses 122 received, the wireless interaction coordinator 110 may determine the identities of which devices are currently within a broadcast and/or other wireless range of the HID 102A.

An inquiry message 118 and an inquiry response exist at the lowest level of communication between two HID devices, e.g., at the physical link (PHY) layer. Based on a successful exchange of an inquiry message and an inquiry response, the wireless interaction coordinator 110 can create the wireless link 108 between the two devices 102A and 102B. Then using the wireless link 108, the two HID devices 102A and 102B can exchange messages (e.g., paging messages) to confirm that they really are intended to connect to each other.

A response parser 121 may parse the inquiry or paging response 122 to determine the identity, e.g., location 124 and class 126, of the device sending or transmitting the inquiry response 122. The location 124 may include an address of the HID 102B, including for example, a media access control (MAC) address or other address or location of the HID 102B on one or more networks. The class 126 may include an identification of the device, including for example, a class or type of device associated with the HID 102B. For example, the class 126 may indicate whether the HID 102B is a mouse, keyboard, joystick, mobile phone or other device. According to an example embodiment, the wireless interaction coordinator 110 and/or response parser 121 may be previously configured with which class (e.g., 126) of device it is trying to detect, and thus may use the class 126 to identify the proper device to which to connect.

As referenced above, according to an example embodiment, the HID 102A may be a master device in a communication network or piconet, with the HID 102B being the slave device. Then, for example, based on the inquiry response 122, the response parser 121 (from the master device) may broadcast another message, page, or invitation to network to one or more devices, including an identification of the device identified in the inquiry response 122 (e.g., the slave device, HID 102B) as indicated by the location 124 and/or class 126. The slave device (e.g., HID 102B) may then accept the invitation to communicate or network and may initiate or otherwise begin a handshaking or connection process with a handshaking engine 128.

The handshaking engine 128 may be configured to establish the wireless link 108 between the HID 102A and HID 102B. For example, the handshaking engine 128 may perform a one-time bond between the HIDs 102A and 102B to establish the wireless link 108. For example, during the handshaking process the handshaking engine 128 may perform security, encryption, authentication and/or bonding with regards to communications between the HID 102A and HID 102B. Then, for example, upon completion of the handshaking process by the handshaking engine 128, the wireless link 108 may be established.

A toggle coordinator 130 located in an HID 102A may coordinate the interaction of the HIDs 102A and 102B via the wireless link 108. For example, the toggle coordinator 130 may poll or otherwise determine which wireless coupling 106A1 or 106B1 is currently active. Then, for example, the toggle coordinator 130 may provide control message(s) 132 from the HID 102A to the HID 102B via the wireless link 108 to coordinate which wireless coupling 106A2 or 106B2 to activate, such that both HIDs 102A and 102B communicate with the same computing device 104A or 104B. Thus, if it is determined that the coupling 106A1 between HID 102A and computing device 104A is active, then a control message 132 sent from HID 102A to HID 102B can cause HID 102B to activate wireless coupling 106A2 with computing device 104A. Similarly, if it is determined that the coupling 106B1 between HID 102A and computing device 104B is active, then a control message 132 sent from HID 102A to HID 102B can cause HID 102B to activate wireless coupling 106B2 with computing device 104B.

The control message 132 may include an instruction, request, command or other message indicating that an active wireless coupling 106 between two or more devices should be made inactive and that another wireless coupling 106 should be made active. For example, the control message 132 may toggle or instruct the HID 102B to toggle between the computing devices 104A and 104B by activating and/or deactivating the wireless couplings 106A2 and 106B2, respectively. In other example embodiments, the control message 132 may indicate specifically which wireless coupling 106A2, 106B2 and or computing device 104A, 104B should be active, or may specify the number of times a toggle should occur in those situations that the wireless couplings 106 are ordered. In other example embodiments, the HIDs 102A and 102B may be wirelessly coupled to more than two computing devices 104A and 104B.

A toggle engine 134 may toggle or otherwise receive a toggling command or instructions with regard to which computing device 104A, 104B to interact with and/or which wireless coupling 106A1, 106A2 to make active/inactive. For example, the toggle engine 134 may receive a command to interact with or switch to the computing device 104B. Then for example, the toggle engine 134 may deactivate the wireless coupling 106A1 and activate the wireless coupling 106A2. Then, for example, the toggle coordinator 130 may transmit the control message 132 to the HID 102B via the wireless link 108 instructing the HID 102B to activate the wireless coupling 106B2 and deactivate the wireless coupling 106B1.

The system 100 may be used to allow multiple HIDs 102A and 102B to be simultaneously wirelessly coupled to multiple computing devices 104A and 104B. Then, for example, the system 100 may allow the HIDs 102A, 102B to be coordinated such that when the HID 102A switches from interacting with the computing device 104A to the computing device 104B, the HID 102B may follow suit. The system 100 may allow, for example, coordination among multiple HIDs 102A, 102B wirelessly coupled to more than one computing device 104A, 104B.

Figure 2:
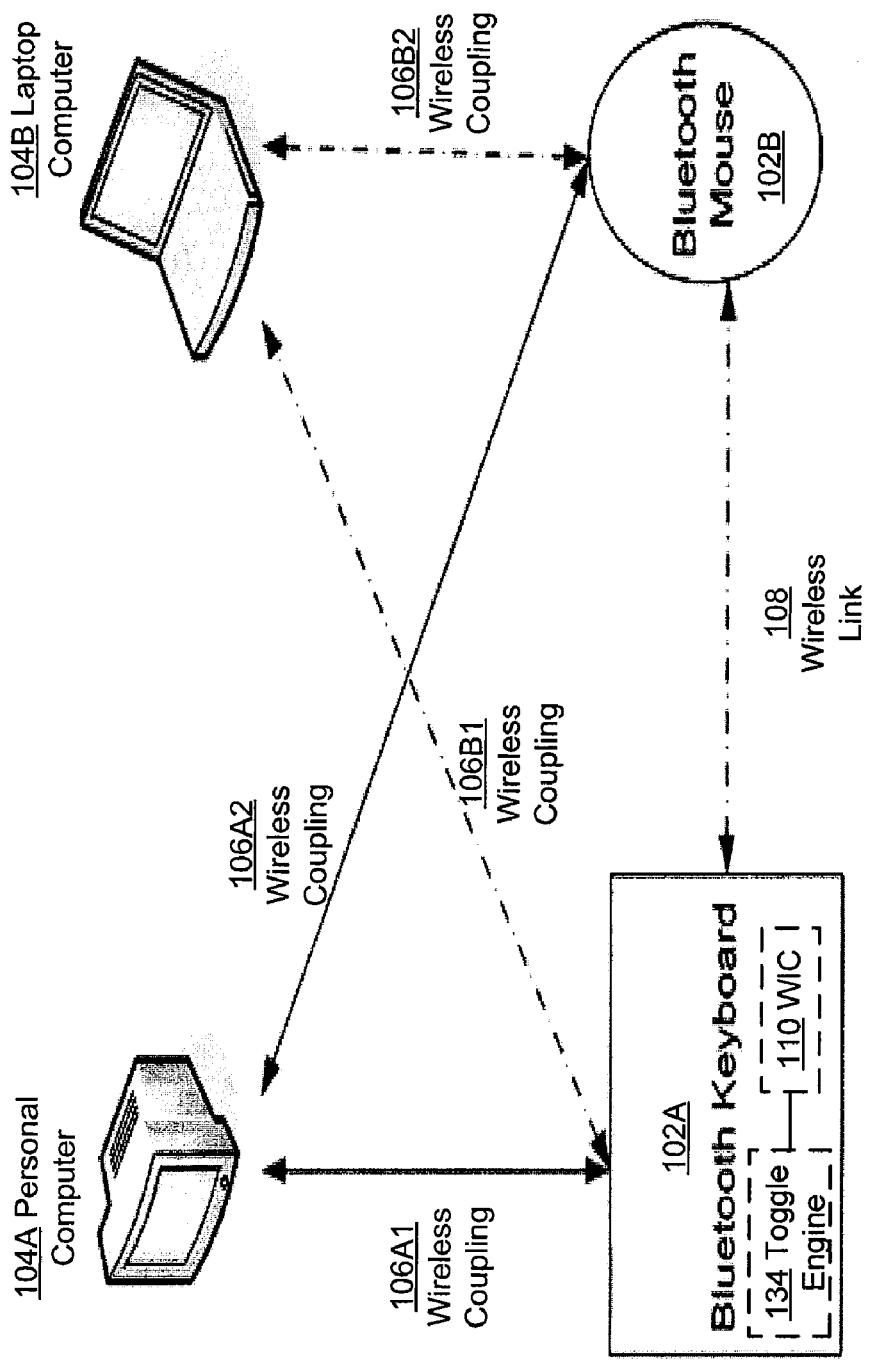
FIG. 2 is a block diagram of an example system for a human interface device (HID) coordination system, according to an example embodiment.

FIG. 2 is a block diagram of an example system 200 for a human interface device (HID) coordination system, according to an example embodiment. In the example of FIG. 2, the system 200 may include a personal computer 104A, a laptop computer 104B, a Bluetooth keyboard 102A, and a Bluetooth mouse 102B.

The personal computer 104A may be wirelessly coupled to both the Bluetooth keyboard 102A and Bluetooth mouse 102B via the wireless couplings 106A1 and 106B1, respectively. The laptop computer 104B may be wirelessly coupled to both the Bluetooth keyboard 102A and Bluetooth mouse 102B via the wireless couplings 106A2 and 106B2, respectively.

In the example of FIG. 2, the wireless couplings 106A1 and 106B1 may be active, while the wireless couplings 106A2 and 106B2 may be inactive. The active/inactive states of the wireless couplings 106, as depicted in FIG. 2, may mean that if a user types something or presses a key on the Bluetooth keyboard 102A and/or scrolls or clicks a mouse button on the Bluetooth mouse 102B, the action by the user may be wirelessly transmitted via the wireless coupling 106A1 or 106B1, respectively, to the personal computer 104A.

As discussed above, the wireless link 108 may be established between the Bluetooth keyboard 102A and Bluetooth mouse 102B upon a determination of multiple wireless couplings 106 between each wireless device. During the time that the wireless couplings 106A1 and 106B1 remain active, though the wireless link 108 may be already established, it may remain predominately inactive to reduce power consumption and/or increase battery life between the Bluetooth keyboard 102A and Bluetooth mouse 102B. According to an example embodiment, active couplings (such as the wireless couplings 106A1 and 106A2) may become temporarily inactive when not being used.

A user operating the Bluetooth keyboard 102A and Bluetooth mouse 102B may then decide to interact with the laptop computer 104B rather than the personal computer 104A. Then, for example, the user may press a button combination on the Bluetooth keyboard 102A that toggles the activity/inactivity of the wireless couplings 106A1 and 106B1. This may result in the wireless coupling 106B1 becoming active, and the user being able to interact with the laptop computer 104B through the Bluetooth keyboard 102A.

Upon receiving the toggle command, the toggle engine 134 may send a toggle request to the wireless interaction coordinator 110 which may activate the wireless link 108 (or otherwise wait until it is activated) and transmit a control message (e.g., control message 132) to the Bluetooth mouse 102B. Upon receiving the control message, the Bluetooth mouse 102B, may similarly deactivate the wireless coupling 106A2 and activate the wireless coupling 106B2. Then, for example, both the Bluetooth keyboard 102A and Bluetooth mouse 102B may be actively coupled to the laptop computer 104B. As discussed above, though predominately inactive, the wireless link 108 may be periodically sniffed and temporarily activated even if no toggle command has been received by the wireless interaction coordinator 110.

Figure 3:
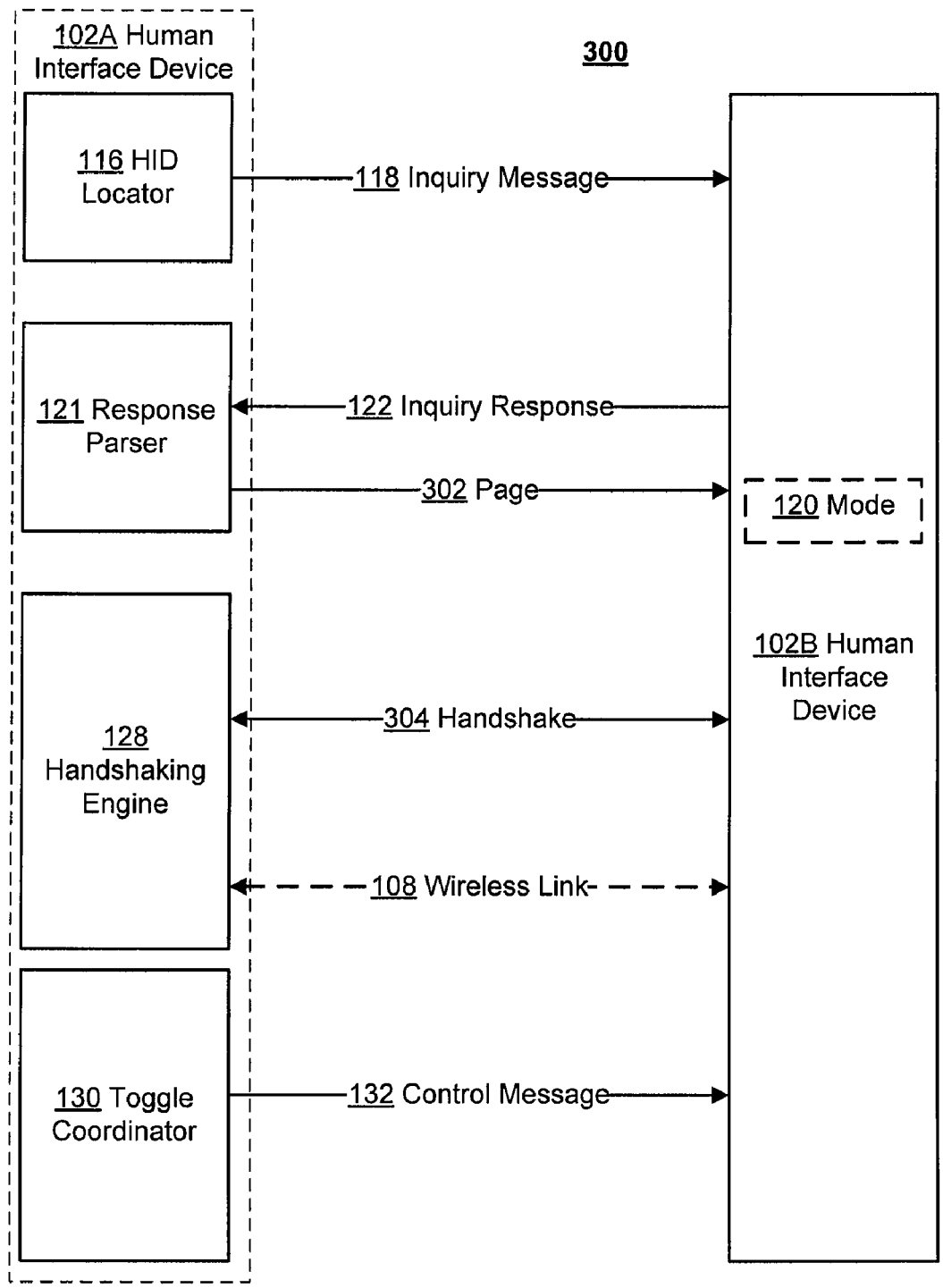
FIG. 3 is an example flow diagram of communications between the components of the system of FIG. 1, according to an example embodiment.

FIG. 3 is an example flow diagram 300 of communications between the components of the system 100 of FIG. 1, according to an example embodiment. The example of FIG. 3, may begin with a coupling detector (e.g., coupling detector 114) determining that a first human interface device (HID) (e.g., HID 102A) is wirelessly coupled to two or more computing devices (e.g., computing devices 104A and 104B) and that no wireless link 108 may be detected (or is otherwise inactive) between the first HID 102A and the second HID 102B.

The HID locator 116 may broadcast the inquiry message 118 where it may be received by the HID 102B, which is in a discoverable mode 120. During the discoverable mode 120, the HID 102B may be configured to establish new connections (e.g., via the wireless link 108) with additional devices (e.g., HID 102A). During an operational mode 120, however, the HID 102B may not be open to making new wireless connections and/or receiving the inquiry or paging response 122. The various modes 120 may prevent the HID 102B from accidentally or unintentionally beginning a new wireless connection with another device. According to an example embodiment, a button press or other switch may be used to toggle the HID 102B from the operational mode to the discovery mode, wherein it may only operate in the discovery mode for a limited period of time and/or until an event, such as the establishment of the wireless link 108, occurs.

The HID 102B may then transmit the inquiry or paging response 122, which may be received by the response parser 121. The response parser 121 may determine from which device(s) it received inquiry or paging responses 122 and may select one of the devices to which a connection is to be formed. Then for example, the response parser 121 may broadcast the page 302 requesting a connection with the device associated with the inquiry response or paging 122.

The HID 102B may then initiate the handshake 304 with the handshaking engine 128. The handshake 304 may include a negotiation between the handshake engine 128 of the first HID 102A and the second HID 102A. The handshake 304 may include a setting of the parameters for communication, including for example, authentication and encryption parameters. The handshake 304 may complete with a bond between the HID 102A and 102B and an establishment of the wireless link 108. Then, for example, the toggle coordinator 130 may transmit a control message 132 via the wireless link 108 to the HID 102B to coordinate the activities by the HIDs 102A and 102B as discussed above.

Figure 4:
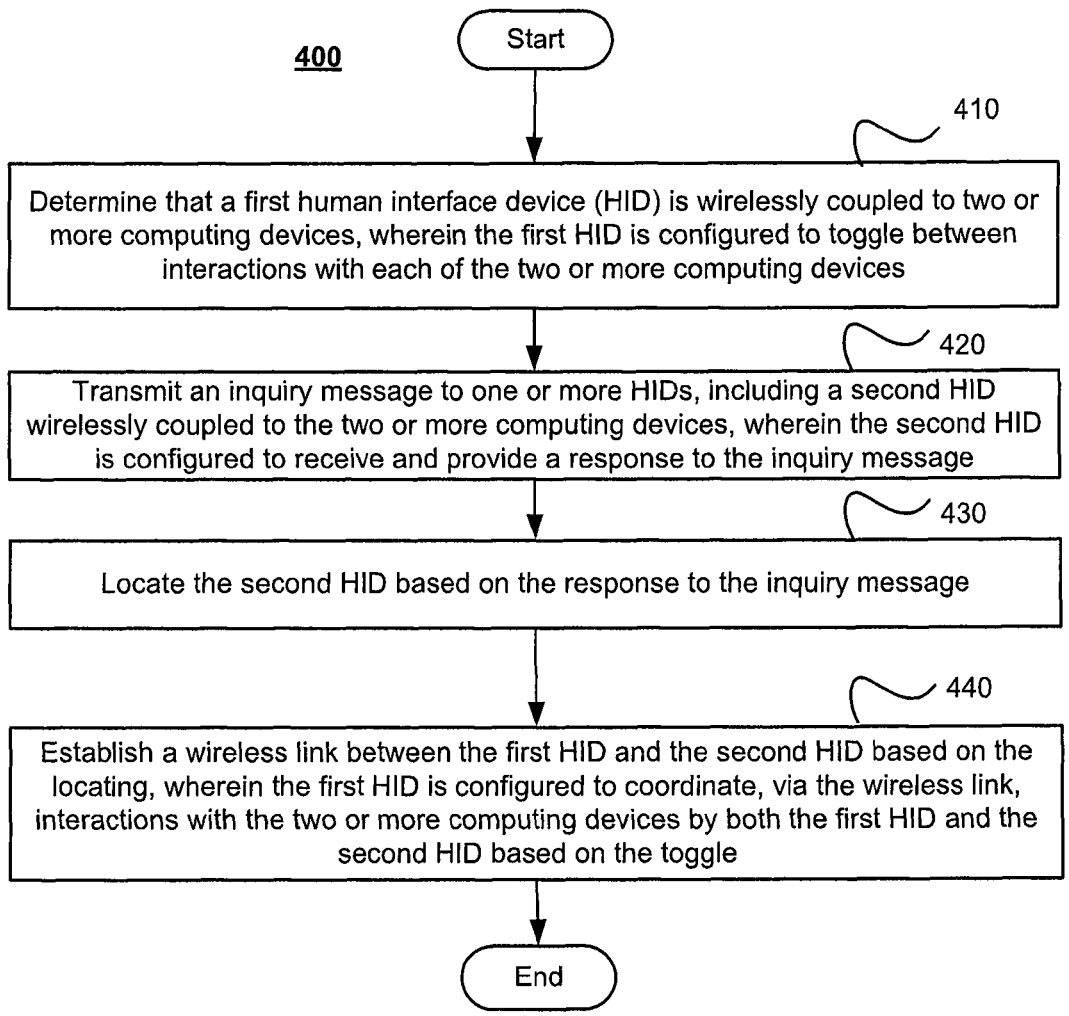
FIG. 4 is a flowchart illustrating example operations of the system of FIG. 1, according to an example embodiment.

FIG. 4 is a flowchart 400 illustrating example operations of the system of FIG. 1, according to an example embodiment. More specifically, FIG. 4 illustrates an operational flow 400 representing example operations related to wireless HID coordination.

After a start operation, a first human interface device (HID) may be determined to be wirelessly coupled to two or more computing devices, wherein the first HID is configured to toggle between interactions with each of the two or more computing devices (410). For example, as shown in FIG. 1, the coupling detector 114 may detect and identify the wireless couplings 106A1 and 106B1 between the HID 102A and the computing devices 104A and 104B, respectively. Then for example, the HID 102A may be configured to toggle between interacting with the computing device 104A and 104B.

An inquiry or paging message may be transmitted to one or more HIDs, including a second HID wirelessly coupled to the two or more computing devices, wherein the second HID is configured to receive and provide a response to the inquiry message (420). For example, the HID locator 116 may transmit the inquiry message or paging 118 to one or more HIDs, including the HID 102B, where the HID 102B is wirelessly coupled to the computing devices 104A and 104B via the wireless couplings 106A2 and 106B2, respectively. Then, for example, the HID 102B may be in a discoverable mode 120 where it may receive the inquiry message 118 and respond with the inquiry or paging response 122.

The second HID may be located based on the response to the inquiry or paging message (430). For example, the response parser 121, based on the inquiry or paging response 122, may determine the location 124 and class 126 of the HID 102B sending the inquiry or paging response 122. Then for example, the response parser 121 may page 302 the HID 102B and request a connection.

A wireless link may be established between the first HID and the second HID based on the identifying of the second HID. The first HID can be configured to coordinate, via the wireless link, interactions with the two or more computing devices by both the first HID and the second HID based on the toggle (440). For example, after the handshake 304, the wireless link 108 may be established between the HID 102A and HID 102B. Then for example, a toggle determined by the toggle engine 134 may be coordinated between the HIDs 102A and 102B by sending the control message 132 over the wireless link 108.

Figure 5:
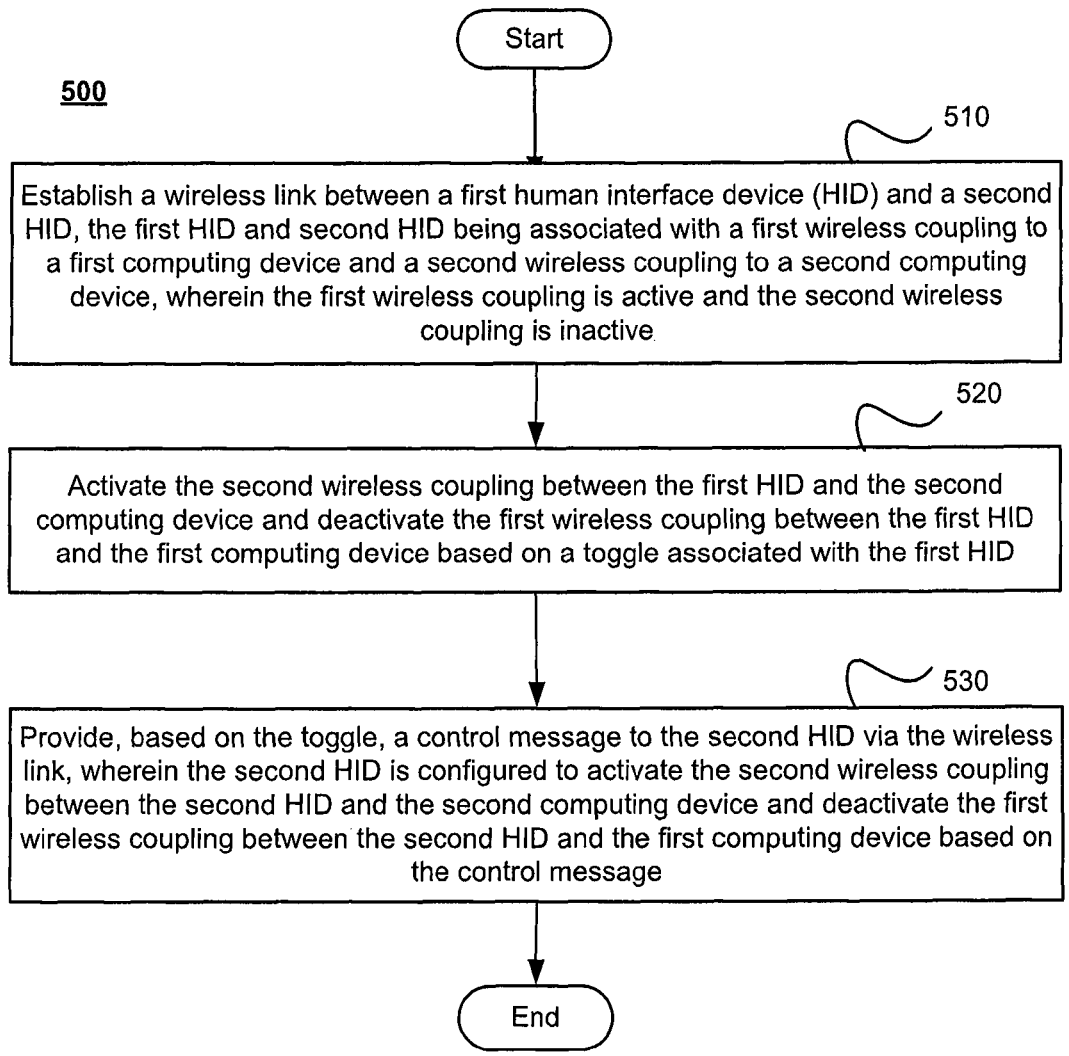
FIG. 5 is a flowchart illustrating example operations of the system of FIG. 1, according to an example embodiment.

FIG. 5 is a flowchart 500 illustrating example operations of the system of FIG. 1, according to an example embodiment. More specifically, FIG. 5 illustrates an operational flow 500 representing example operations related to wireless HID coordination.

After a start operation, a wireless link may be established between a first human interface device (HID) and a second HID, the first HID and second HID being associated with a first wireless coupling to a first computing device and a second wireless coupling to a second computing device, wherein the first wireless coupling is active and the second wireless coupling is inactive (510). For example, as shown in FIG. 1, the wireless link 108 may be established between the HIDs 102A and 102B. Then for example, the HIDs 102A and 102B may be actively coupled to the computing device 104A via the wireless couplings 106A1 and 106A2, respectively. The HIDs 102A and 102B may also include inactive couplings to the computing device 102B via the wireless couplings 106B1 and 106B2, respectively.

The second wireless coupling between the first HID and the second computing device may be activated and the first wireless coupling between the first HID and the first computing device may be deactivated based on a toggle associated with the first HID (420). For example, the toggle engine 134 may determine a toggle associated with the HID 102A. Then, for example, based on the toggle the toggle coordinator 130 may deactivate the wireless coupling 106A1 and activate the wireless coupling 106B1.

Based on the toggle, a control message may be provided to the second HID via the wireless link, wherein the second HID is configured to activate the second wireless coupling between the second HID and the second computing device and deactivate the first wireless coupling between the second HID and the first computing device based on the control message (430). For example, the toggle coordinator 130 may provide or transmit the control message 132 to the HID 102B via the wireless link 108. Then for example, the HID 102B may deactivate the wireless coupling 106A2 and activate the wireless coupling 106B2 based on the control message 132.

Although the above description is provided in terms of specific examples, it will be appreciated that many other examples and settings are contemplated.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method comprising:
   determining that a first human interface device (HID) is wirelessly coupled to two or more computing devices, wherein the first HID is configured to toggle between interactions with each of the two or more computing devices;
   transmitting an inquiry or paging message to one or more HIDs, including a second HID wirelessly coupled to the two or more computing devices, wherein the second HID is configured to receive and provide a response to the inquiry or paging message;

identifying the second HID based on the response to the inquiry or paging message; and establishing a wireless link between the first HID and the second HID based on the identifying, wherein the first HID is configured to coordinate, via the wireless link, interactions with the two or more computing devices by both the first HID and the second HID based on the toggle.

2. The method of claim 1 wherein the determining comprises wirelessly coupling the first HID to each of the two or more computing devices.

3. The method of claim 1 wherein the determining comprises determining a status associated with the toggle, wherein the first HID is actively coupled to one of the computing devices based on the status.

4. The method of claim 1 wherein the transmitting comprises providing the inquiry or paging message to the second HID.

5. The method of claim 1 wherein the first HID is a keyboard and the second HID is a mouse.

6. The method of claim 1 wherein the transmitting comprises broadcasting the inquiry or paging message to the second HID wherein the second HID is in a discoverable mode.

7. The method of claim 6 wherein the establishing comprises establishing the wireless link between the first HID and the second HID during the discoverable mode of the second HID.

8. The method of claim 1 wherein the identifying comprises determining an address of the second HID based on the response.

9. The method of claim 1 wherein the identifying comprises determining a class of the second HID based on the response.

10. The method of claim 1 wherein the establishing comprises establishing a master-slave link between the first HID and the second HID, wherein the first HID is the master to the second HID.

11. The method of claim 1 wherein the establishing comprises performing a handshake between the first HID and the second HID.

12. The method of claim 1 wherein the establishing comprises bonding the first HID to the second HID.

13. A system comprising:
a coupling detector configured to determine that a first Bluetooth (BT) enabled human interface device (HID) is wirelessly coupled to a first computing device and a second computing device, the first BT enabled HID being configured to toggle between interacting with the first computing device and the second computing device;

an HID locator configured to provide an inquiry or paging message to a second BT enabled HID wirelessly coupled to the first computing device and the second computing device;

a response parser configured to parse a response to the inquiry or paging message by the second BT enabled HID and determine a location of the second BT enabled HID;

handshaking engine configured to establish a wireless link between the first BT enabled HID and the second BT enabled HID based on the location of the second BT enabled HID; and a toggle coordinator configured to provide one or more control messages associated with the toggle from the first BT enabled HID to the second BT enabled HID via the wireless link, wherein the second BT enabled HID is configured to coordinate its interactions with the first computing device and second computing device with the first BT enabled HID based on the one or more control messages.

14. The system of claim 13 wherein the handshaking engine is configured to establish a master-slave relationship between the first BT enabled HID and the second BT enabled HID, wherein the first BT enabled HID is the master.

15. The system of claim 13 wherein the toggle coordinator is configured to activate a first wireless coupling between the first BT enabled HID and the first computing device and deactivate a second wireless coupling between the first BT enabled HID and the second computing device based on the toggle.

16. The system of claim 13 wherein the response parser is configured to determine a class of the second BT enabled HID.

17. The system of claim 13 wherein the toggle coordinator is configured to deactivate a first wireless coupling between the first BT enabled HID and the first computing device and activate a second wireless coupling between the first BT enabled HID and the second computing device based on the toggle.

18. A method comprising:
establishing a wireless link between a first human interface device (HID) and a second HID, the first HID and second HID being associated with a first wireless coupling to a first computing device and a second wireless coupling to a second computing device, wherein the first wireless coupling is active and the second wireless coupling is inactive;

activating the second wireless coupling between the first HID and the second computing device and deactivating the first wireless coupling between the first HID and the first computing device based on a toggle associated with the first HID; and providing, based on the toggle, a control message to the second HID via the wireless link, wherein the second HID is configured to activate the second wireless coupling between the second HID and the second computing device and deactivate the first wireless coupling between the second HID and the first computing device based on the control message.

19. The method of claim 18 wherein the establishing comprises determining that the first wireless coupling and second wireless coupling are established.

20. The method of claim 18 wherein the providing comprises generating the control message based on the toggle.

* * * * *